US009833103B2

(12) United States Patent
Talon

(10) Patent No.: US 9,833,103 B2
(45) Date of Patent: Dec. 5, 2017

(54) CAPSULE-BASED FOOD PREPARATION SYSTEM

(71) Applicant: NESTEC S.A., Vevey (CH)

(72) Inventor: Christian Talon, Vufflens-le-Chateau (CH)

(73) Assignee: Nestec S.A., Vevey (CH)

( * ) Notice: Subject to any disclaimer, the term of this patent is extended or adjusted under 35 U.S.C. 154(b) by 215 days.

(21) Appl. No.: 14/434,468

(22) PCT Filed: Oct. 4, 2013

(86) PCT No.: PCT/EP2013/070725
§ 371 (c)(1),
(2) Date: Apr. 9, 2015

(87) PCT Pub. No.: WO2014/056802
PCT Pub. Date: Apr. 17, 2014

(65) Prior Publication Data
US 2015/0282663 A1    Oct. 8, 2015

(30) Foreign Application Priority Data

Oct. 12, 2012  (EP) .................................... 12188391

(51) Int. Cl.
*A47J 31/06*        (2006.01)
*A47J 31/36*        (2006.01)
(Continued)

(52) U.S. Cl.
CPC ................. *A47J 31/36* (2013.01); *A23F 3/18* (2013.01); *A23F 5/262* (2013.01); *A47J 31/002* (2013.01);
(Continued)

(58) Field of Classification Search
CPC ...... A47J 31/0668; A47J 31/002; A47J 31/36; B65D 85/8043; B65D 85/8046; A23F 5/262; A23F 3/18
(Continued)

(56) References Cited

U.S. PATENT DOCUMENTS

2006/0065127 A1*  3/2006  Dalton ............... B65D 85/8046
                                                                99/279
2010/0154906 A1   6/2010  Skalski et al.
(Continued)

FOREIGN PATENT DOCUMENTS

EP          1704803         9/2006
EP          2030915         3/2009
(Continued)

OTHER PUBLICATIONS

International Preliminary Report on Patentability and Written Opinion for PCT/EP2013/070725 dated Apr. 15, 2015.*

*Primary Examiner* — Thien S Tran
(74) *Attorney, Agent, or Firm* — K&L Gates LLP

(57) ABSTRACT

A food preparation system includes a food preparation machine with a receptacle for a food capsule and a fluid injecting member, and the food capsule including a capsule body, a cavity, a first end, an opening communicating with the cavity, a second end including at least one outlet communicating with the cavity, an injection wall, and at least one partition dividing the cavity into chambers containing a respective quantity of an alimentary substance and having at least one outlet with an independently-operable closure member in the second end. The injection means injects a quantity of fluid into the capsule through a single injection point, and a sealing member selectively blocks fluid communication between the chambers, resisting a pressure difference between the chambers of between 2 and 20 bar, preferably between 4 and 15 bar.

14 Claims, 2 Drawing Sheets

(51) Int. Cl.
*A47J 31/00* (2006.01)
*B65D 85/804* (2006.01)
*A23F 3/18* (2006.01)
*A23F 5/26* (2006.01)

(52) U.S. Cl.
CPC ...... *A47J 31/0668* (2013.01); *B65D 85/8043* (2013.01); *B65D 85/8046* (2013.01)

(58) Field of Classification Search
USPC ........ 99/279, 295, 300; 426/61, 77, 80, 112, 426/115
See application file for complete search history.

(56) References Cited

U.S. PATENT DOCUMENTS

| | | | |
|---|---|---|---|
| 2010/0159077 A1* | 6/2010 | Skalski | A47J 31/0668 426/80 |
| 2013/0071532 A1* | 3/2013 | Pribus | A47J 31/46 426/431 |
| 2014/0255563 A1* | 9/2014 | Rondelli | A47J 31/407 426/115 |

FOREIGN PATENT DOCUMENTS

| | | |
|---|---|---|
| WO | 2009092628 | 7/2009 |
| WO | 2011124990 | 10/2011 |

* cited by examiner

CAPSULE-BASED FOOD PREPARATION SYSTEM

CROSS REFERENCE TO RELATED APPLICATIONS

The present application is a National Stage of International Application No. PCT/EP2013/070725, filed on Oct. 4, 2013, which claims priority to European Patent Application No. 12188391.2, filed on Oct. 12, 2012, the entire contents of which are being incorporated herein by reference.

FIELD OF THE INVENTION

This invention relates generally to a food preparation system employing a food capsule for use in a food preparation machine. This invention also relates to a method for employing such a food preparation system.

BACKGROUND

Food preparation systems employing food preparation machines are well known in the food industry and consumer goods domain. Such machines allow a consumer to prepare on command a single serving of a beverage such as brewed coffee, espresso coffee, tea, hot chocolate drink, or the like.

Most food preparation machines for in-home use operate according to a system in which alimentary substances such as beverage ingredients are provided in individually-packaged, single-serving portions. Such portions can be soft pods, pads, or sachets, but increasingly more systems use semi-rigid or rigid portions such as rigid pods or capsules. In the following, it should be understood that the food preparation machine in question employs a rigid or semi-rigid capsule.

In many instances, the capsules for use in food preparation machines are sealed. Such sealed capsules are advantageous in that they protect their contents from the surrounding atmosphere, improving the shelf life of the capsule. Typically, such closed capsules are made from a gas and/or moisture impermeable material, and feature a rigid or semi-rigid body having one of its walls made from a flexible membrane.

The product is prepared by inserting the capsule into a food preparation machine, which preferably comprises a receptacle for accommodating said capsule and a fluid injection system for injecting a fluid (preferably water) under pressure into said capsule. In most applications, the water injected into the capsule under pressure is heated, generally to a temperature above 70° C. However, in some particular instances it may be advantageous to inject tepid or chilled water instead. The pressure inside the capsule chamber during extraction and/or dissolution of the capsule contents is typically about 1 to about 8 bar for dissolution products and about 2 to about 12 bar for extraction of roast and ground coffee.

The present invention could also encompass the so-called "brewing" process, such as for preparing a beverage—particularly for tea and coffee. Brewing involves the infusion over time of the ingredient in a fluid, most commonly hot water, whereas extraction or dissolution preparations produce a beverage within a few seconds.

For purposes of clarity, however, in this document the term "brewing" of an ingredient by a fluid is understood to encompass extraction of a powdered edible material (e.g. roast and ground powdered coffee), dissolution of edible soluble material (e.g. soluble tea, coffee, milk, or cocoa), or the infusion of an edible material in an infusion fluid under very low or atmospheric pressure, for a longer time than that required for extraction or dissolution (e.g. tea leaves in hot water).

The principle of extracting and/or dissolving the contents of a closed capsule under pressure is known and consists typically of confining the capsule in a receptacle of a machine, injecting a quantity of pressurized water into the capsule to extract or dissolve the substance, and then dispensing the resulting beverage from the capsule.

The injection is generally performed by piercing a face of the capsule with a piercing injection element, such as a fluid injection needle incorporated into the machine. Capsules applying this principle have already been described, for example in applicant's European patent n° EP 1 472 156 B1, and in EP 1 784 344 B1.

In addition, machines applying this principle have already been described for example in patents CH 605 293 and EP 242 556. According to these documents, the machine comprises a receptacle for the capsule, and a perforation and injection element made in the form of a hollow needle comprising in its distal region one or more fluid injection orifices. The needle has a dual function in that it simultaneously opens the top portion of the capsule while providing an inlet channel into the capsule for the injection of the water.

The machine further comprises a supply of the fluid (usually water) that is used to prepare the beverage from the substance(s) contained in the capsule. The machine further comprises a heating unit such as a boiler or a heat exchanger, which heats the water used therein to working temperatures (usually between 80° and 90° C.). Finally, the machine comprises a pump for circulating the water from the tank to the capsule, optionally though the heating unit. The circulation of the water within the machine may be directed via a selecting valve means, such as for instance a peristaltic valve of the type described in applicant's European patent application EP 2162653 A1.

Such systems are particularly well-adapted to the preparation of coffee. One configuration for achieving this which is particularly advantageous is to provide a capsule containing roast and ground coffee powder, which is extracted with hot water injected therein.

Capsules have been developed for such an application, which are described and claimed in applicant's European patent EP 1784344 B1, or in European patent application EP 2 062 831.

In short, such capsules typically comprise:
- a hollow body and an injection wall which are impermeable to liquids and to air, the wall being attached to the body and adapted to be punctured by e.g. an injection needle of the machine;
- a chamber containing a bed of roast and ground coffee to be extracted;
- an aluminium membrane disposed at the bottom end of the chamber for retaining the internal pressure therein, the membrane being associated with piercing means which create drainage holes in the aluminium membrane when the internal pressure inside the chamber reaches a certain pre-determined value; and
- optionally, a deflection means configured to break up the jet of fluid, thereby reducing the speed of the jet of fluid injected into the capsule and evenly distributing the fluid across the bed of substance at a reduced speed.

During extraction, the food capsule is pierced by the fluid injection needle of the food preparation machine, usually in the aluminium membrane. The fluid is injected in the capsule chamber and the pressure within the capsule increases, facilitating the extraction of the product from the ingredients contained within the capsule.

In some implementations, the food preparation machine also pierces the capsule at a second location, for instance at its bottom, permitting the beverage to flow out during the operation of the machine. In others, the food capsule may be provided with a spout or drain, to which is generally affixed a valve or a membrane that opens when the pressure within the capsule builds up to the level required for proper beverage preparation When producing simple food products, i.e. those with only one ingredient, or that which may be prepared in a single step, the arrangements of the prior art produce satisfactory results. However, they are poorly adapted to the preparation of more complicated food products.

Specifically, presently-known food capsules require that the entire quantity of alimentary substance present in the capsule be prepared at the same time, during the injection of fluid into the capsule. While a beverage may have several ingredients, the resulting beverage must therefore be a homogeneous mixture.

For instance, many coffee beverages are based on the principles of providing the ingredients in a certain order or layering ingredients. In the food preparation systems known in the art, however, the range of possible beverages which may be produced from existing food capsules is limited.

In particular, beverages such as cappuccinos, mochas, and the like require one to layer in a cup different beverage components such as espresso coffee, milk, flavoured syrup, etc. To make these beverages with the food capsules known in the art, one must insert a first capsule containing a first beverage component, prepare that first beverage component, remove the first capsule, insert a second capsule containing a second beverage component, prepare the second beverage component, and so on.

This process is more complex and requires a great deal more effort to complete than the preparation of a simple beverage such as espresso coffee or hot tea. It also requires the user to purchase and store a greater number of capsules, and generates more waste for disposal than the preparation of simple beverages.

The European patent application EP 1704803 to Tuttoespresso SpA discloses a capsule having multiple compartments for preparing several different products from the same capsule, and generally it discloses a beverage system using such a capsule. Each compartment can comprise a separate outlet. The beverage machine to which the capsule is to be connected, comprises several water injection inlets, which correspond to each separate compartment of the capsule.

The American patent application publication US 2010/0154906 describes a multicompartment capsule and a beverage system such a capsule, wherein the capsule comprises one inlet and one outlet. The inside of the capsule can be divided into several compartments, through which water can flow to make corresponding product components. The inlet, the outlet, and the compartment openings of the capsule can be made to open simultaneously or consecutively. The capsule mixes all the components simultaneously through its single opening.

It is therefore an object of the present invention to provide a food preparation system which ameliorates the shortcomings of the systems known in the prior art.

SUMMARY OF THE INVENTION

According, therefore, to a first aspect, the invention is directed to a food preparation system configured to produce a food product, comprising a food preparation machine provided with a receptacle for a food capsule and an injection means for injecting a pressurized fluid therein; and a food capsule enclosing a cavity and having a first end comprising an opening communicating with said cavity, a second end comprising at least one outlet communicating with said cavity, an injection wall closing said first end, and at least one partition disposed within said cavity dividing said cavity into a plurality of chambers, each containing a quantity of an alimentary substance. Preferably, said partition extends from said injection wall to said second end and each of said chambers is in communication with at least one outlet provided in said second end, each outlet being provided with an independently-operable closure means. The capsule can have the shape of a cup.

According to the invention, said food preparation machine is characterized in that it comprises an injection means configured to inject a quantity of fluid into one first chamber of said capsule through a single injection point, and further comprises an openable sealing means configured to selectively block fluid communication between at least two of said chambers during the injection of a quantity of fluid in said first chamber, said sealing means capable of resisting a pressure difference between said chambers of between 2 and 20 bar, preferably between 4 and 15 bar.

This is advantageous in that a food preparation system so configured will prepare a food product from multiple food components which are all provided in different chambers a single same food capsule. Furthermore, each of the alimentary substances is held separately and prepared into a food component in a predetermined order, rather than being mixed together and prepared simultaneously as in food preparation systems of the prior art. The food preparation system of the present invention is thereby adapted to produce food products comprising multiple food components prepared individually, enlarging the scope of different foods which may be prepared with a capsule-based food preparation system.

This aspect is also advantageous in that since each food component is prepared from its respective alimentary component individually, the conditions under which the fluid is injected into the capsule may be adapted for each of the alimentary substances contained within the food capsule. Specifically, the temperature, pressure, volume, etc. of the fluid injected into the food capsule may be varied during the food preparation process, such that each of the alimentary substances is prepared into a food component under conditions optimal to that particular alimentary substance. Furthermore, one may combine in the same capsule alimentary substances which would not otherwise be compatible due to differences in the conditions under which they may be prepared into food components. In this way, the quality of the food prepared by the food preparation system of the invention is optimized.

This aspect is further advantageous in that the food preparation system requires only a single injection means. As only one injection device is employed, the complexity of the internal mechanisms and plumbing of the food preparation machine is greatly reduced. The reliability of the food preparation is thus substantially increased, while reducing the cost of its fabrication.

Last but not least, the capsule according to the present invention allows to distribute in a very flexible way, different types of contents that independently flow from the different compartments of the capsule. Moreover, each product component flowing from one compartment, can be dispensed at a delayed time relative to other components. Even more than that, it is possible to use only selected compartments of the capsule, leaving some others closed. For instance, the same capsule can contain coffee and milk ingredients in separate compartment, and the use can chose to dispense milk only, or coffee only, or coffee and milk which will be both dispensed at the same time for producing a milk coffee in the cup, or which will be both dispensed consecutively for producing a cappuccino-type product in the cup with separated layers of milk and coffee.

Preferably, said food product is a liquid or semi-liquid beverage.

This is advantageous in that liquid and semi-liquid beverages are particularly well-adapted to being prepared from a food capsule in the food preparation system of the present invention.

According to a feature, said sealing means comprises a sealing edge of the partition and a pressing means disposed within the food preparation machine, configured to press together said sealing edge and an adjacent wall of said capsule.

This is advantageous in that the fluid communication between two chambers of the food capsule is blocked and re-established merely by advancing or retracting the pressing means, simplifying the operation of the food preparation system. Furthermore, the seal between the sealing edge of the partition and the adjacent wall of the food capsule is solely a function of the pressure exerted on the adjacent wall by the pressing means, meaning the seal between the two may be broken and re-established on command, repeatedly if so desired. This aspect both simplifies the operation of the food preparation system of the invention and permits a greater number of operative configurations of the food capsule.

Preferably, said pressing means comprises a substantially annular die.

This is advantageous in that a substantially annular die is generally symmetric, simplifying the positioning of the die in relation to the food capsule. This improves the ease with which the food preparation system of the present invention may be employed. A substantially annular die may also be manufactured at relatively low cost, permitting the advantages of this aspect to be realized at a minimum of cost.

According to another feature, said food capsule further comprises a frangible attachment between said sealing edge and said adjacent wall of said capsule, said frangible attachment being configured to rupture under a pressure differential between 2 and 20 bar, preferably between 4 and 15 bar.

This is advantageous in that a frangible attachment disposed between the sealing edge and an adjacent wall of the food capsule will prevent the mixing of the alimentary substances within the food capsule. The frangible attachment ensures that each quantity of alimentary substance remains in its respective chamber, especially when the food capsule is inverted or agitated such as during transport. This improves the quality and consistency of the food product produced by the system of the present invention.

Furthermore, configuring the frangible wall to rupture under a pressure within the range given above is advantageous in that when preparing a food product comprising alimentary substances which are to be prepared under different pressures, the rupturing pressure of the frangible wall may be chosen such that it remains in place during a low-pressure phase injection but is broken during a high-pressure phase. In this way, a seal between the chambers of the beverage capsule may be opened automatically during the food preparation process.

According to another feature, said adjacent wall of said capsule is the injection wall.

This is advantageous in that the body of the food capsule may be supplied in one piece, having a generally cup-shaped body, at least one partition disposed within the body, and a flange or other means at an open end to which the injection wall is affixed. This permits one to fabricate the body of the food capsule in one piece, needing only to fill it with the alimentary substances and attach the injection wall. The fabrication of the beverage capsules is thereby rendered easier, faster, and more economical.

According to still another feature, said food preparation system comprises a rupturing means, said rupturing means being disposed to rupture at least one of said closure means when deflected into contact with said rupturing means.

This is advantageous in that a chamber of a food capsule so configured will open itself when the pressure inside that chamber accumulates to a sufficient level. Specifically, during the injection of fluid the pressure within the chamber will cause the closure means to deflect into the rupturing means, thereby rupturing the closure means and permitting the food component to drain from the outlet. In this way, the construction and operation of the food preparation machine is simplified, rendering it less expensive and more reliable to use.

Preferably, the rupturing means comprises an array of pyramidal projections.

This is advantageous in that a rupturing means so configured will provide a great number of points at which the closure means may be ruptured. Said pyramids may be configured as to have a base in a shape which tessellates, such as a triangle or hexagon; the rupturing means will therefore be provided with a large quantity of points in a relatively small area. Furthermore, the points of said array of pyramids are less likely to dull over the life of the food preparation machine than a rupturing means in another configuration (e.g. needles or blades). In this way, the durability and performance of the invention is improved.

In one possible embodiment, said rupturing means is disposed within said food capsule.

This is advantageous in that, by providing the rupturing means within the food capsule, a new rupturing means is employed each time a new capsule is inserted and a food product is produced by the food preparation machine. This will serve to prevent clogging and accumulation of food particles in the rupturing means, thereby improving the cleanliness and reliability of the food preparation machine.

In another possible embodiment, said rupturing means is disposed within said receptacle of said food preparation machine.

This is advantageous in that providing the rupturing means within the food preparation machine itself simplifies the construction of the food capsules, thereby rendering them less expensive to fabricate. For a food preparation system employing capsules of fixed dimensions, providing a rupturing means within the food preparation machine further permits a greater volume of alimentary substance to be provided within the capsule, in that none of the volume of the capsule need be used to accommodate a rupturing means. Finally, providing the rupturing means within the food preparation machine itself also permits one to utilize materials or configurations which may not be technically or economically feasible when employed within the food capsule itself. In this way, the economy and capability of the food preparation system of the present invention is increased.

According to a second aspect, the invention is directed to a method for preparing a food product by employing a food preparation system according to any of claims 1 to 10, comprising the steps of blocking communication between different chambers of the food capsule by actuating a sealing means, said sealing means being optionally disposed within the food preparation machine; injecting a first quantity of a fluid into a first chamber of a food capsule, thereby preparing a quantity of a first alimentary substance disposed therein into a first food component; optionally dispensing said first food component from said food capsule; releasing the seal between the first chamber and a second chamber of said food capsule, thereby permitting fluid communication between said first and second chambers; injecting a second quantity of fluid into said first chamber, said second quantity of fluid flowing into said second chamber and thereby preparing a quantity of a second alimentary substance disposed in the second chamber of said food capsule into a second food component; and dispensing said second, and optionally said first, food component(s) from said food capsule through corresponding outlet(s).

This is advantageous in that this method prepares each of the alimentary substances disposed within the food capsule into a food component and dispenses them in turn, while injecting fluid into the capsule at a single point. The injection mechanism of the food preparation machine carrying out this process will therefore be much simpler than those known in the prior art, in that multiple injection means and the associated fluid supply and control means are rendered superfluous.

According to a feature, the food capsule comprises a single outlet, each of said food components being dispensed through said outlet.

This is advantageous in that providing a food capsule with a single outlet simplifies the form and construction of the food preparation machine employed, in that it need only accommodate a single outlet from the food capsule. Furthermore, properly locating the food capsule within the food preparation machine is simplified, in that only one outlet need be positioned correctly for the beverage machine to properly dispense the food components into a container. In particular, a centrally-located outlet may be configured to automatically locate itself when the capsule is seated in the capsule receptacle of the food preparation machine. The performance of the method of the invention is thereby rendered simpler and less expensive.

Alternatively, each of said chambers is furnished with its own outlet, each food component being dispensed though an outlet communicating with the chamber in which said food component is provided.

This is advantageous in that each outlet may be configured to open when the conditions within their respective chambers are optimal for the preparation of the alimentary substance therein. Each resulting food component is thereby dispensed at the ideal moment, ensuring the quality and consistency of the food products so produced.

Alternatively, each of said chambers of the food capsule comprises an outlet opened at the beginning of the injection step, and further characterized in that said opening step is performed by rupturing said seal under a pressure differential between the first and second chambers of said food capsule.

This is advantageous in that the process may be advanced from step to step, moving from the injection of one chamber to the injection of another chamber, merely by increasing the pressure within the food capsule. The control means necessary to carry out the method are thereby reduced, rendering the performance of the method simpler and less expensive.

According to still another feature, the outlets of the food capsule are opened substantially simultaneously, prior to or during the step for injecting a first quantity of fluid.

This is advantageous in that it simplifies the usage of the food capsule in the food preparation process. Opening all of the outlets of the food capsule simultaneously will dispense the food components simultaneously, while still preparing them individually within their respective chambers. In this way, one may prepare food products whose ingredients may not be stored together, but which must be mixed during the food preparation process. In this way, the capabilities of the food preparation process of the invention are further expanded.

According to a third aspect, the invention is directed to a food capsule comprising a cup-shaped capsule body enclosing a cavity, said capsule body comprising a first end and a second end, said first end comprising an opening communicating with said cavity and said second end comprising at least one outlet communicating with said cavity; an injection wall closing said opening of said first end of said capsule body; and at least one partition disposed within said cavity and dividing said cavity into a plurality of chambers. Each chamber contains a quantity of an alimentary substance and is in communication with at least one outlet provided in said second end; and further comprises a releasable seal between said chambers, said releasable seal comprising said at least one partition and either said capsule body or said injection wall of said beverage capsule.

According to the invention, said releasable seal is released by means external to said food capsule.

This is advantageous in that the means for releasing the releasable seal may be positioned in the food preparation machine and integrated with the means used to inject the quantity of fluid into the food capsule during the food preparation process. The precision and reliability of the food preparation system in which the food capsule is used are thereby improved.

Furthermore, providing the means for releasing outside the capsule permits the costs of the capsule itself to be minimized, in that a complex mechanism such as a releasing means is provided in the beverage machine and not in the consumable capsule. The economy of the food capsule and the food preparation process incorporating it are thereby improved.

Most importantly, the invention provides a solution for dispensing several ingredients prepared in different locations of the same capsule, optionally at different times, while allowing such a preparation of different ingredients separately within the capsule while using a single injection point in the beverage machine. Therefore, the capsule according to the invention provides a solution for complex ingredient preparation with a beverage machine having a simple construction of its fluid system.

Other particularities and advantages of the invention will also emerge from the following description.

BRIEF DESCRIPTION OF THE DRAWINGS

In the accompanying drawings, given by way of non-limiting examples.

DETAILED DESCRIPTION OF THE INVENTION

Figure 1:
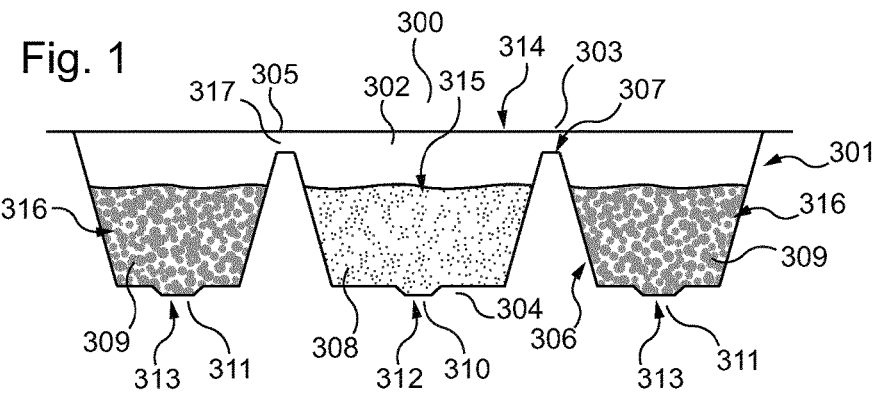
FIG. 1 depicts a side section view of a food capsule adapted for use in the food production system of the invention, according to a first embodiment.

FIG. 1 is a section view of a food capsule adapted for use in the food production system of the invention. The first food capsule 300 comprises a capsule body 301, enclosing a cavity 302 and having a first end 303 and a second end 304. At the first end 303 is an opening 305, which is in communication with the cavity 302 and the second end 304.

The first food capsule 300 is also provided with a partition 306, which extends from the second end 304 into the cavity 302. In the embodiment depicted, the partition 306 comprises a pair of slanted circular walls, which meet to form an annular sealing edge 307. The partition 306 thus divides the cavity 302 into a central chamber 308 and a peripheral chamber 309.

In an alternate embodiment, the two walls of the partition may be configured so as to provide the chambers 308, 309 in a particular form or volume, or to facilitate the provision of an alimentary substance therein.

The first food capsule 300 is further provided with central and peripheral outlets 310, 311, which are disposed in the second end 304 so as to be in communication with the central and peripheral chambers 308, 309, respectively. The outlets 310, 311 are each provided with a first and second closure means 312, 313, which seal the outlets 310, 311. Finally, the first food capsule 300 is provided with an injection wall 314 over the opening 305 at the first end 303, thereby sealing the cavity 302 of the first food capsule 300.

The closure means 312, 313 may be configured to burst or tear when the corresponding chamber 308, 309 achieves a pre-determined internal pressure. Alternatively, the closure means 312, 313 may be configured to deflect under pressure but not rupture by itself, instead deflecting into a rupturing means which causes the closure means 312, 313 to burst or tear. In another alternative, the closure means 312, 313 is removed by the consumer manually, just prior to the insertion of the first food capsule 300 into a food preparation machine. And in another possible alternative, the closure means 312, 313 is a plug or membrane which dissolves when a fluid is injected into the corresponding chamber 308, 309. For example, such a closure means 312, 313 may be fabricated from a starch compound which dissolves when exposed to a liquid, or from an edible film which melts when exposed to the heat of the food preparation process.

Furthermore, it should be understood that the closure means 312, 313 need not be of identical construction or composition. The closure means 312, 313 may be chosen such that the properties of each are optimized for the particular alimentary substance contained within the corresponding chamber 308, 309.

In the embodiment depicted in FIG. 1, the first closure means 312 is disposed over the central outlet 310 of the central chamber 308. The first closure means 312 is here configured as a thin membrane fabricated from aluminium, configured to rupture itself when the pressure within the central chamber 308 rises to between 1 and 3 bar.

The second closure means 313 is also preferably an aluminium membrane, though provided in a thickness sufficient to resist rupturing when the peripheral chamber 309 is pressurized. Instead, the second closure means 313 is configured to deflect as the peripheral chamber 309 is pressurized. The second closure means 313 is preferably configured to deflect into a rupturing means disposed either within the first food capsule 300 itself, or within a capsule holder of a food preparation machine adapted to receive the first food capsule 300. When the pressure within the peripheral chamber 309 reaches a pre-determined point, preferably between 8 and 12 bar, the second closure means 313 will deflect into contact with the rupturing means and be opened.

Within each of the chambers 308, 309 is provided a quantity of an alimentary substance: a first alimentary substance 315 within the central chamber 308 and a second alimentary substance within the peripheral chamber 309.

Preferably, the first alimentary substance 315 is a soluble ingredient, such as powdered milk, which is prepared at a relatively low pressure; and the second alimentary substance 316 is one which is extracted or otherwise prepared at a relatively high pressure, such as roast & ground coffee. However, other combinations of alimentary substances within the chambers 308, 309 of the food capsule may be employed.

In this embodiment, the partition 306 is not bonded to the injection wall 314. Instead, a space 317 exists between the interior surface of the injection wall 314 and the sealing edge 307 of the partition 306. The space 317 permits fluid communication between the central and peripheral chambers 308, 309, thereby permitting both alimentary substances 315, 316 to be prepared with fluid injected into the first food capsule 300 from a single injection point.

Figure 2A:
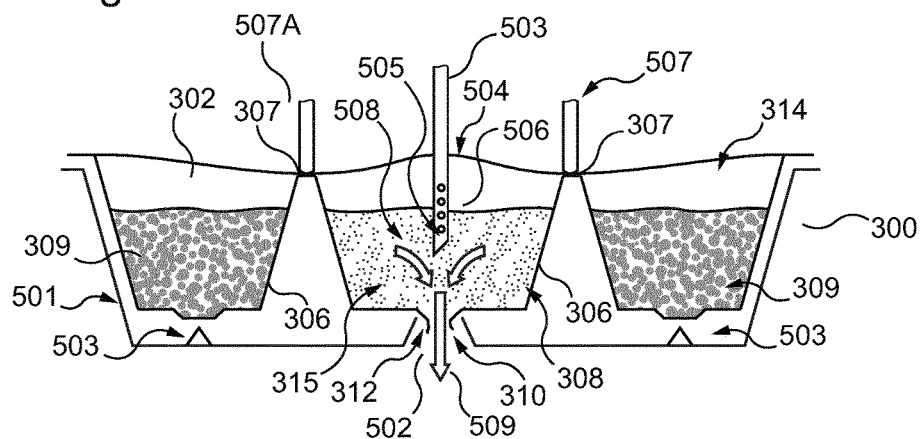
FIG. 2A depicts a side section view of the food capsule of FIG. 1 during a first injection step.
Figure 2B:
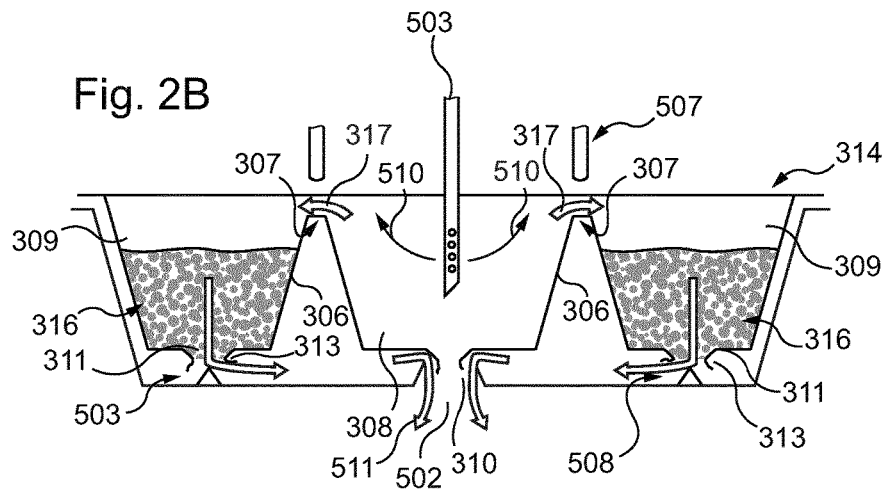
FIG. 2B depicts a side section view of the food capsule of FIG. 1 during a second injection step.

FIGS. 2A and 2B depict a method for preparing a food product such as a beverage from a food capsule, in particular the first food capsule 300 depicted in FIG. 1. FIG. 2A depicts a first step in this method.

In this method, a food preparation machine 500 is provided to accommodate the beverage capsule. The food preparation machine 500 comprises a capsule receptacle 501, generally conforming to the shape of the first food capsule 300. The capsule receptacle 501 further comprises a centrally-disposed drain 502 and a rupturing means 503. The rupturing means 503 is here provided as an array of pyramidal projections, disposed in a circular arrangement within the capsule receptacle 501. However, alternate configurations of the rupturing means, for instance an annular blade, are also possible.

At the start of a first injection step, the food capsule is pierced by the injection needle 503 at the injection point 504. The injection needle 503 has a closed tip 505, being instead provided with a plurality of injection holes 506 at a distal end.

The food preparation machine 500 further comprises a sealing means 507A, which is here provided in the form of the pressing means 507 and the sealing edge 307. The pressing means 507 is a substantially annular die which presses into the injection wall 314, causing it to deflect and press into the partition 306 at the sealing edge 307. A seal is thereby created between the sealing edge 307 and the interior surface of the injection wall 314, thereby preventing fluid communication between the central chamber 308 and the peripheral chamber 309.

Subsequent to the establishment of the seal the injection needle 503 injects a first quantity of fluid 508 into the central chamber 308, combining with the first alimentary substance 315 and creating a first food component 509. The first food component 509 then drains from the central outlet 310, the closure means 311 of which having been ruptured by the pressure of injection, and through the drain 502 of the beverage machine 500.

FIG. 2B depicts a second injection step. The sealing ring 507 is withdrawn from the injection wall 314, such that the injection wall 314 returns to its original position. Fluid communication is thereby re-established between the central and peripheral chambers 308, 309 through the space 317 between the internal surface of the injection wall 314 and the sealing edge 307 of the partition 306.

The injection needle 503 injects a second quantity of fluid 510 into the central chamber 308 at an increased pressure relative to the first quantity of fluid 508. The second quantity of fluid 510 subsequently flows into the peripheral chamber 309 via the newly-opened space 317. As the second quantity of fluid 510 is injected, the pressure within the peripheral chamber 309 accumulates. The second quantity of fluid will mix with the second alimentary substance 316 provided within the peripheral chamber 309, producing a second food component 511.

In a variant embodiment, the injection needle 503 may be configured to mate with the interior surface of the central outlet 510. In this alternate embodiment the injection needle 503 is mobile relative to the axis of the beverage capsule 300, such that that at the beginning of the second injection step it is advanced into the central outlet 510 to block the second quantity of fluid 510 from exiting through the central outlet 510.

When the pressure has accumulated to a pre-determined point, the second closure means 313 will be deflected into the rupturing means 503 and rupture. The second food component 511 is then conducted from the peripheral outlet 310 and out the drain 502 of the food preparation machine 500.

In a possible variant, the first and second closure means 312, 313 may be configured to open at substantially the same pressure. In a food capsule so configured, the first injection step will prepare the first alimentary substance 315 into the first food component 509, which will remain within the first food capsule 300 during the second injection step. During the second injection step, the sealing means 507 will be retracted, re-establishing fluid communication through the space 317. The second quantity of fluid 508 will continue to increase the pressure within the first food capsule 300 while it prepares the second alimentary substance 316 within the peripheral chamber 309 into a second food component 511. When the pressure within the first food capsule 300 reaches the pre-determined point, the closure means 311, 312 all open, releasing the two food components 509 and 511 through the drain 502 of the beverage machine 500.

Figure 3A:
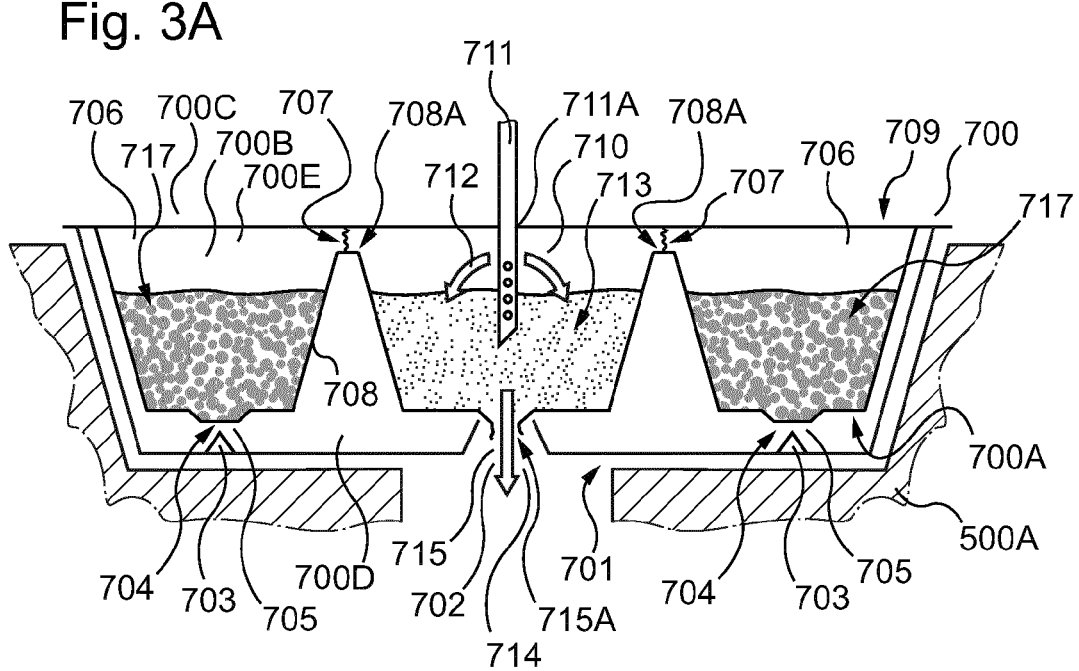
FIG. 3A depicts a side section view of a food capsule adapted for use in the food production system of the invention, according to a second embodiment, during a first injection step.
Figure 3B:
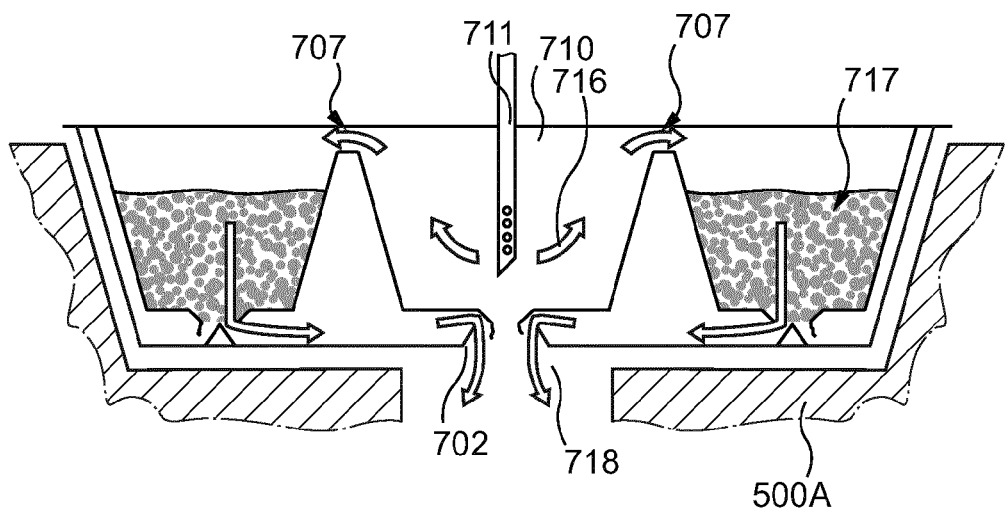
FIG. 3B depicts a side section view of a food capsule adapted for use in the food production system of the invention, according to a second embodiment, during a first injection step.

FIGS. 3A and 3B depict an alternate embodiment of the invention. FIG. 3A depicts a second food capsule 700 during a first injection step, seated in the beverage machine 500A. The second food capsule 700 is substantially similar to the first food capsule 300 seen in the previous figures, in that it comprises a capsule body 700A defining a cavity 700B, having a first and second end 700C, 700D, and an opening 700E in communication with said cavity 700B. The second food capsule 700 is furthermore used in substantially the same way as the first food capsule 300. However, the second food capsule 700 is provided with a shell 701, which is itself provided with a capsule outlet 702. The shell 701 is also provided with rupturing means 703, which are disposed so as to rupture a closure means 704 disposed on a peripheral port 705 of a peripheral chamber 706, as in the previous embodiment. The effective result is that while in the previous embodiment the rupturing means 503 were provided in the capsule receptacle 501 of the food preparation machine 500, in this embodiment the rupturing means 703 are disposed within the second food capsule 700 itself.

The second food capsule 700 is further provided with a frangible attachment 707 disposed between the sealing edge 708A of the partition 708 and the injection wall 709. The frangible attachment 707 is here provided as a membrane, but may alternately be provided as a baffle, seam, or other such attachment as may be appropriate for the application. The frangible attachment 707 effectively seals the interface between the peripheral chamber 706 and the central chamber 710. The frangible attachment 707 is configured to rupture when the pressure differential across it reaches a certain pre-determined point, generally between 2 and 20 bar and preferably between 4 and 15 bar.

During the first injection step, the injection needle 711 pierces the injection wall 709 at the injection point 711A and injects a first quantity of fluid 712 into the central chamber 710. The first quantity of fluid 712 mixes with the first alimentary substance 713 to form a first food component 714, which is dispensed from the second food capsule 700 through a single outlet 702 upon the rupturing of the first closure means 715A disposed on the single outlet 702.

FIG. 3B depicts the second injection step. The injection needle 711 injects a second quantity of fluid 716 into the central chamber 710, increasing the pressure therein until the frangible attachment 707 ruptures. The second quantity of fluid 716 mixes with the second alimentary substance 717 and produces a second food component 718, which is dispensed through the capsule outlet 702 as in the previous embodiment.

Of course, the invention is not limited to the embodiments described above and in the accompanying drawings. Modifications remain possible, particularly as to the construction of the various elements or by substitution of technical equivalents, without thereby departing from the scope of protection of the invention.

First, it should be understood that, while the foregoing discussion is concerned with a food capsule having two chambers, the invention may easily be adapted to yield a food production system where the food capsule comprises three or more chambers, each containing a quantity of a respective alimentary substance.

Furthermore, it should be understood that the possible configurations of food capsules is not limited to the examples described herein. In particular, it should be recognized that a multitude of variations incorporating differing alimentary substances, capsule configurations, capsule geometries, closure means, and other such variations are all possible.

Also, it should be understood that the configuration of the food preparation machine adapted to receive such capsules, in particular the configuration of the injection means and the means for holding and opening the food capsule, may also be varied according to the particular application in which the food capsules and food preparation machine are to be employed.

The exact configuration and operation of the invention as practiced may thus vary from the foregoing description without departing from the inventive principle described therein. Accordingly, the scope of this disclosure is intended to be exemplary rather than limiting, and the scope of this invention is defined by any claims that stem at least in part from it.

The invention claimed is:

1. A food preparation system configured to produce a food product, the food preparation system comprising:
    a food preparation machine provided with a receptacle for a food capsule and an injection member configured to inject a pressurized fluid into the food capsule; and
    the food capsule enclosing a cavity and having a first end comprising an opening communicating with the cavity, a second end comprising at least one outlet communicating with the cavity, an injection wall closing the first end, and at least one partition disposed within the cavity dividing the cavity into a plurality of chambers, each chamber containing a quantity of an alimentary substance,
    the injection member is configured to inject a quantity of fluid into a first chamber of the plurality of chambers of the food capsule through a single injection point, and the food preparation machine further comprises a sealing member configured to selectively block fluid communication between at least two of the plurality of chambers during the injection of the quantity of fluid in the first chamber, the sealing member configured to resist a pressure difference between the at least two of the plurality of chambers of between 2 and 20 bar.

2. The food preparation system of claim 1, where the food product is a liquid or semi-liquid beverage.

3. The food preparation system of claim 1, where the sealing member comprises:
    a sealing edge of the at least one partition; and
    a pressing member disposed within the food preparation machine and configured to press together the sealing edge and an adjacent wall of the food capsule.

4. The food preparation system of claim 3, where the pressing member comprises a substantially annular die.

5. The food preparation system of claim 3, where the food capsule comprises a frangible attachment between the sealing edge and the adjacent wall of the food capsule, the frangible attachment being configured to rupture under a pressure differential between 2 and 20 bar.

6. The food preparation system of claim 3, where the adjacent wall of the food capsule is the injection wall.

7. A food preparation system configured to produce a food product, the food preparation system comprising:
    a food preparation machine provided with a receptacle for a food capsule and an injection member configured to inject a pressurized fluid into the food capsule;
    the food capsule enclosing a cavity and having a first end comprising an opening communicating with the cavity, a second end comprising at least one outlet communicating with the cavity, an injection wall closing the first end, and at least one partition disposed within the cavity dividing the cavity into a plurality of chambers, each chamber containing a quantity of an alimentary substance; and
    a rupturing member, the rupturing member being disposed to rupture at least one closure member when the at least one closure member is deflected into contact with the rupturing member,
    the injection member is configured to inject a quantity of fluid into a first chamber of the plurality of chambers of the food capsule through a single injection point, and the food preparation machine further comprises a sealing member configured to selectively block fluid communication between at least two of the plurality of chambers during the injection of the quantity of fluid in the first chamber, the sealing member capable of resisting a pressure difference between the at least two of the plurality of chambers of between 2 and 20 bar.

8. The food preparation system of claim 7, where the rupturing member comprises an array of pyramidal projections.

9. The food preparation system of claim 7, where the rupturing member is disposed within the food capsule.

10. The food preparation system of claim 7, where the rupturing member is disposed within the receptacle of the food preparation machine.

11. The food preparation system of claim 7, where the sealing member comprises:
    a sealing edge of the at least one partition; and
    a pressing member disposed within the food preparation machine and configured to press together the sealing edge and an adjacent wall of the food capsule.

12. The food preparation system of claim 11, where the pressing member comprises a substantially annular die.

13. The food preparation system of claim 11, where the food capsule comprises a frangible attachment between the sealing edge and the adjacent wall of the food capsule, the frangible attachment being configured to rupture under a pressure differential between 2 and 20 bar.

14. The food preparation system of claim 11, where the adjacent wall of the food capsule is the injection wall.

* * * * *